United States Patent
Snow et al.

[11] Patent Number: 5,118,390
[45] Date of Patent: Jun. 2, 1992

[54] DENSIFIED TACTILE IMAGING PAPER

[75] Inventors: Larry D. Snow, Alpharetta, Ga.; Sonia M. Pomalaza, Miami, Fla.

[73] Assignee: Kimberly-Clark Corporation, Neenah, Wis.

[21] Appl. No.: 758,381

[22] Filed: Sep. 3, 1991

Related U.S. Application Data

[63] Continuation of Ser. No. 574,324, Aug. 28, 1990, abandoned.

[51] Int. Cl.$^5$ .................. D21H 13/00; D21H 13/10; D21H 27/32; B32B 29/00
[52] U.S. Cl. .................. 162/123; 162/141; 162/146; 162/157.4; 162/149; 162/129; 162/130; 162/132; 156/308.2; 156/324; 156/309.6; 428/535; 428/537.5; 434/113
[58] Field of Search .................. 162/141, 146, 157.4, 162/149, 123, 129, 130, 132; 156/324, 289, 308.2, 309.6; 428/535, 537.5; 434/113

[56] References Cited

U.S. PATENT DOCUMENTS

| | | | |
|---|---|---|---|
| Re. 19,528 | 4/1935 | Rafton | 162/175 |
| 212,866 | 3/1879 | Newton . | |
| 311,939 | 2/1885 | Armour . | |
| 1,195,888 | 8/1916 | Wheelwright . | |
| 1,831,928 | 11/1931 | Rafton . | |
| 1,945,537 | 2/1934 | Schwartz . | |
| 2,036,882 | 4/1936 | Pattilloch et al. . | |
| 2,113,034 | 4/1938 | Rowland et al. . | |
| 2,147,213 | 2/1939 | Pattilloch . | |
| 2,197,463 | 4/1940 | Bradner . | |
| 2,199,750 | 5/1940 | Meincke . | |
| 2,207,555 | 7/1940 | Rowland | 162/175 |
| 2,897,109 | 7/1959 | Voigtman . | |
| 3,114,670 | 12/1963 | Iwasaki | 162/146 |
| 3,223,579 | 12/1965 | Dorland et al. | 162/123 |
| 3,243,340 | 3/1966 | Cadotte | 162/135 |
| 3,356,556 | 12/1967 | Violette et al. | 156/244 |
| 3,419,345 | 12/1968 | Parrish . | |
| 3,420,734 | 1/1969 | Anderson et al. | 162/135 |
| 3,421,960 | 1/1969 | Arbit . | |
| 3,421,964 | 1/1969 | Arbit . | |
| 3,431,166 | 3/1969 | Mizutani et al. | 162/135 |
| 3,470,055 | 9/1969 | Wade . | |

(List continued on next page.)

FOREIGN PATENT DOCUMENTS

| | | | |
|---|---|---|---|
| 778797 | 7/1957 | United Kingdom . | |
| 803670 | 10/1958 | United Kingdom | 162/177 |
| 1117731 | 6/1968 | United Kingdom . | |
| 011152 | 4/1983 | United Kingdom . | |

OTHER PUBLICATIONS

Article by Steiger et al. entitled "The Absorption of Liquids by Compressed Fiber Systems", Textile Research Journal, 42, No. 8 (Aug. 1972), pp. 443–449.
Article in C&EN (Mar. 2, 1987) entitled "Soluble Paper Foils Cops, Enemy Agents", referring to paper called Dissolvo manufactured by Gilbreth International Corp., Bensalem, Pa.

Primary Examiner—Karen M. Hastings
Assistant Examiner—Brenda Lamb
Attorney, Agent, or Firm—William D. Herrick

[57] ABSTRACT

There is disclosed a tactile imaging paper comprising a tactile sheet and a backing sheet laminated together. The tactile sheet is a cellulosic sheet formed from a highly dilute furnish of from 30% to 60% chemically modified high alpha pulp, 35% to 70% softwood pulp (or a mixture of softwood pulp and hardwood pulp with the hardwood pulp comprising up to 50% of the mixture), and 0.5% to 6% polyvinyl alcohol fiber. The tactile sheet is formed from the furnish without any wet pressing of the tactile sheet. Once the tactile sheet is dry, it is dry calendered to a density of from 0.3 to 0.9 grams per cubic centimeter. Moreover, the tactile sheet has a porosity of greater than 1000 centimeters per minute. The tactile sheet has a basis weight from 75 to 200 grams per square meter and with a laminated backing sheet the tactile imaging paper has a basis weight of about 190 gsm.

15 Claims, 1 Drawing Sheet

POROSITY AND TACTILE RISE AS A FUNCTION OF DENSIFICATION

U.S. PATENT DOCUMENTS

| Number | Date | Name | Class |
|---|---|---|---|
| 3,498,865 | 3/1970 | Paquin et al. | 156/244 |
| 3,509,020 | 4/1970 | Gelsomino . | |
| 3,551,410 | 12/1970 | MacDonald et al. . | |
| 3,592,730 | 7/1971 | Newman | 162/137 |
| 3,669,822 | 6/1972 | Cowen . | |
| 3,670,731 | 6/1972 | Harmon | 128/156 |
| 3,686,024 | 8/1972 | Nankee et al. . | |
| 3,794,558 | 2/1974 | Back | 162/175 |
| 3,826,711 | 7/1974 | Schoggen et al. . | |
| 3,900,216 | 8/1975 | Hayashi et al. | 282/27.5 |
| 3,919,042 | 11/1975 | Spiller | 162/135 |
| 3,930,073 | 12/1975 | Drelich et al. | 427/341 |
| 3,936,542 | 2/1976 | Cox | 427/288 |
| 3,998,690 | 12/1976 | Lyness et al. | 162/141 |
| 4,012,543 | 3/1977 | Ranger et al. | 427/361 |
| 4,123,593 | 10/1978 | Dorr et al. | 428/535 |
| 4,136,218 | 1/1979 | Nischwitz et al. | 427/339 |
| 4,210,685 | 7/1980 | Login et al. | 427/361 |
| 4,217,901 | 8/1980 | Bradstreet et al. | 128/290 |
| 4,250,306 | 2/1981 | Lask et al. | 536/88 |
| 4,256,877 | 3/1981 | Karlsson et al. | 536/39 |
| 4,263,344 | 4/1981 | Radvan et al. | 427/150 |
| 4,270,977 | 6/1981 | Herman et al. | 162/168 |
| 4,300,981 | 11/1981 | Carstens | 162/111 |
| 4,354,901 | 10/1982 | Kopolow | 162/158 |
| 4,500,594 | 2/1985 | Credali | 162/123 |
| 4,503,098 | 3/1985 | Potts | 427/394 |
| 4,507,473 | 3/1985 | Bernert et al. | 536/86 |
| 4,544,580 | 10/1985 | Haruta et al. | 427/261 |
| 4,581,257 | 4/1986 | Kondo et al. | 427/336 |
| 4,609,432 | 9/1986 | Brucato | 162/141 |
| 4,620,992 | 11/1986 | Nojima et al. | 427/362 |
| 4,710,270 | 12/1987 | Sunden et al. | 162/175 |
| 4,846,932 | 7/1989 | Karita et al. | 162/127 |

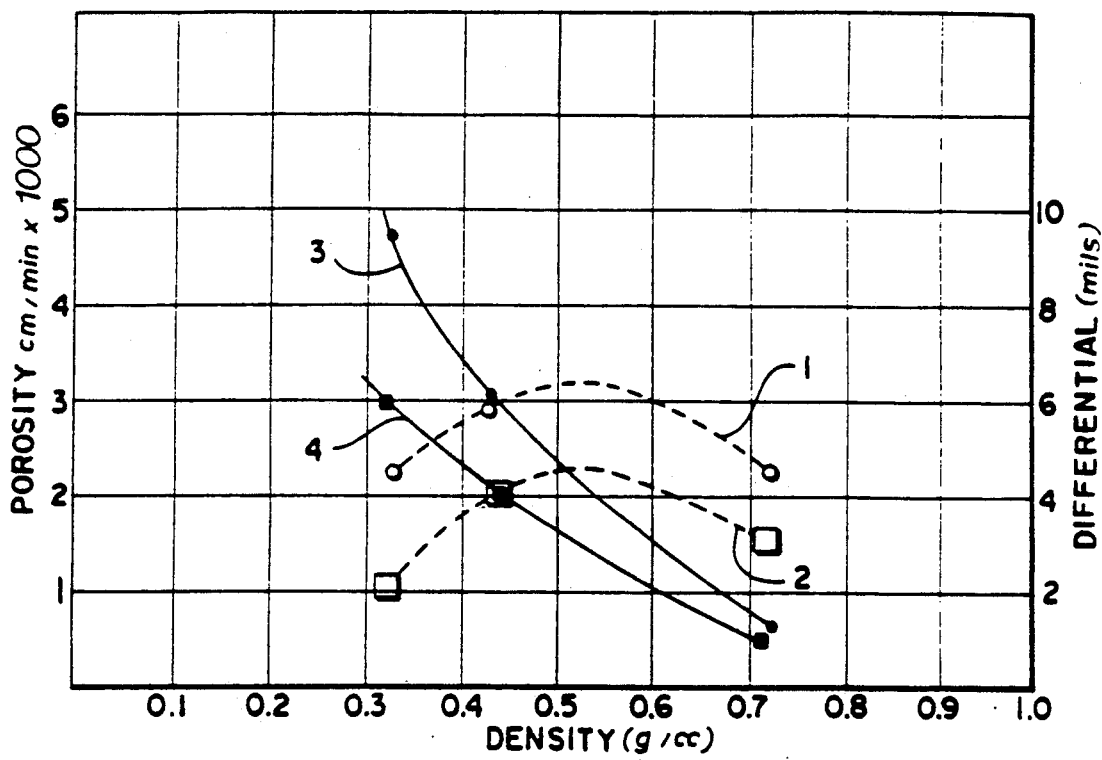
Fig-1 POROSITY AND TACTILE RISE AS A FUNCTION OF DENSIFICATION
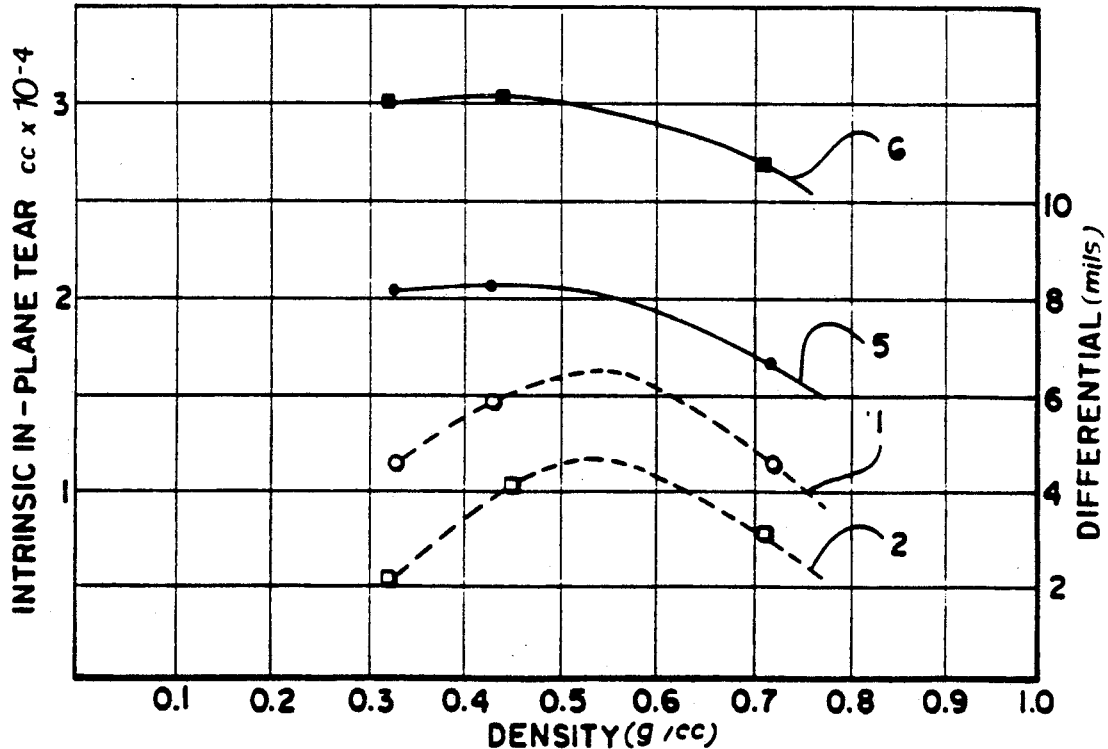
Fig-2 INTRINSIC IN-PLANE TEAR AND TACTILE RISE AS A FUNCTION OF DENSIFICATION

DENSIFIED TACTILE IMAGING PAPER

This is a continuation of copending application Ser. No. 07/574,324 filed on Aug. 28, 1990, now abandoned.

BACKGROUND OF THE INVENTION

This invention relates generally to tactile imaging paper which is capable of producing a raised pattern when written upon with a writing fluid, and more particularly concerns a tactile imaging paper comprising a backing sheet laminated with polyethylene film to a tactile sheet that has been densified by dry calendering to enhance the height of the raised image on the paper.

In the past, various schemes have been proposed for facilitating nonverbal communications with the visually impaired. The most common method of nonverbal communication with the visually impaired is Braille which is a widely used tactile method of communication. Braille is a six position code of dots of two columns and three rows. Depending on the location and combination of the dots, letters, numbers, words, or phrases are denoted. Braille communication, however, is limited to alpha numeric communication and does not provide any means for depicting pictorial representations such as graphs, maps, or other representations that are not alpha numeric. Another common scheme for nonverbal communications for the visually impaired is the Sewell drawing kit. This device consists of a board with a hard rubber surface and clips that hold a piece of cellophane over the surface. A sharp instrument, carefully manipulated, is used to scratch the cellophane surface thereby raising a welt which can be felt and deciphered by the visually impaired. The Sewell drawing kit requires both a fine touch in drawing the image on the cellophane and a very delicate touch to decipher the raised welts.

A number of other prior art methods of nonverbal communication for the visually impaired are set forth in U.S. patent application Ser. No. 160,803, filed Feb. 26, 1988, by Traylor et al. The Traylor et al. reference discloses a writing paper suitable for communication with a visually impaired person which writing paper comprises a cellulosic sheet on which the application of a writing fluid causes an expansion of the cellulosic material to produce a raised pattern readable by touch. The pattern remains readable after the writing fluid has dried. The cellulosic sheet is formed from a 75:25 blend of Aquasorb F-C (superabsorbent carboxymethylated cotton and/or other linters) and hardwood pulp. The writing fluid contains a hardening agent, for example, a monosaccharide such as sucrose or a polysaccharide such as starch, so that upon drying, the raised pattern remains hard and readable to the touch. The cellulosic sheet is laminated to a polyester film to increase the height of the raised pattern, to preserve the integrity of the sheet, and to inhibit strikethrough of the writing fluid. The high percentage of superabsorbent fibers in the tactile imaging paper of the Traylor et al. reference is commercially unattractive because the superabsorbent fiber is substantially more expensive than conventional wood pulps used in paper making.

SUMMARY OF THE INVENTION

It is therefore an object of the present invention to provide an improved tactile imaging paper comprising a backing sheet laminated with polyethylene film to a tactile sheet which tactile sheet does not include superabsorbent fibers.

It is also an object of the present invention to provide an improved tactile imaging paper with improved image height or rise as compared to prior tactile imaging paper.

The foregoing objects of the present invention are achieved by forming a cellulosic tactile sheet of conventional wood pulp fibers. During the forming process, the tactile sheet is not wet pressed. After the tactile sheet has been formed without wet pressing, it is dried and then densified by dry calendering. By avoiding wet pressing during forming, the fibers in the tactile sheet remain bulky and unbonded. The dry calendering consolidates the tactile sheet without producing significant interfiber bonding so that improved image rise results when the tactile imaging paper is subsequently wet by the writing fluid.

More particularly the tactile sheet of the improved tactile imaging paper is formed from a highly dilute furnish comprising by weight from 30% to 60% chemically modified high alpha pulp, 35% to 70% softwood pulp (or a mixture of softwood pulp and hardwood pulp with the hardwood pulp comprising up to 50% of the mixture), and 0.5% to 6% polyvinyl alcohol fiber. The furnish is formed into a tactile sheet having a basis weight of from 75 to 200 grams per square meter (gsm) and a density of between 0.15 and 0.35 grams per cubic centimeter (g/cc). After the tactile sheet has been formed, the tactile sheet is dried and then dry calendered to a density of between 0.3 and 0.9 g/cc. Because the tactile sheet is not highly bonded the tactile sheet will have a porosity above 1,000 centimeters per minute (cm/min).

The densified tactile sheet is laminated with an adhesive to a generally liquid impervious backing sheet. The backing sheet inhibits strikethrough of the writing fluid, provides additional strength for the tactile imaging paper, and provides a base to urge the expansion of the tactile sheet upward to thereby increase the tactile rise.

BRIEF DESCRIPTION OF THE DRAWINGS

FIG. 1 is a graph showing the porosity and image height or rise as a function of tactile sheet density; and FIG. 2 is a graph showing the in-plane tear strength and image rise as a function of tactile sheet density.

DETAILED DESCRIPTION OF THE INVENTION

While the invention will be described in connection with the preferred method and embodiment, it will be understood that we do not intend to limit the invention to that method or embodiment. On the contrary, we intend to cover all alternatives, modifications, and equivalents as may be included within the spirit and scope of the invention as defined by the appended claims.

Analysis of the tactile imaging paper produced in accordance with the teachings of the Traylor et al. reference indicates that the superabsorbent fiber, produces tactility in that paper not as a result of its absorbent nature but as a result of its debonding effect on the other fibers in the paper substrate. Having discovered that debonding of the fibers in the tactile sheet is related to tactility of the tactile imaging paper of the Traylor et al. reference, it follows that other methods of producing debonding of fibers in the tactile sheet should result in a tactile imaging paper without the necessity of using the superabsorbent fiber.

Consequently, we have discovered that producing a cellulosic tactile sheet without compaction during the wet paper making process results in a tactile sheet that does not have a high degree of internal bonding. A suitable tactile sheet for a tactile imaging paper can thus be formed from conventional wood pulp fibers without superabsorbent fibers by avoiding compaction of the tactile sheet during the wet paper making process and later compacting the tactile sheet by dry calendering.

The tactile imaging paper of the present invention comprises a tactile sheet laminated with polyethylene film to a backing sheet. The backing sheet can be any suitable liquid impervious sheet that can inhibit strike-through of the writing fluid, provide strength when laminated to the tactile sheet, and provide a base to urge the expansion of the tactile sheet upward. The backing sheet may also take the form of a coating such as those described in the Traylor et al reference which is incorporated herein by reference. In addition, the tactile imaging paper of the present invention can be constructed without a backing sheet.

In connection with the present invention, the backing sheet is preferably a conventional bonded cellulosic paper having a basis weight of from 30 to 80 gsm. The basis weight is selected to match the basis weight of the tactile sheet so that the combined basis weight of the tactile sheet and the backing sheet is preferably about 190 gsm although a heavier tactile sheet can be used when no backing is attached. The backing sheet is preferably bonded to the tactile sheet with 0.5 mil high density polyethylene which serves as both adhesive and liquid impervious layer.

The tactile sheet is formed on a conventional inclined wire paper making machine. The furnish used to make the tactile sheet of the present invention is a highly dilute furnish comprising by weight from 30% to 60% chemically modified high alpha pulp such as a mercerized kraft pulp made by ITT Rayonier Inc. under the name of Mercenier, 35% to 70% softwood pulp (or a mixture of softwood pulp such as Federal Albacel manufactured by Federal and hardwood pulp (Eucalyptus) with the hardwood pulp comprising up to 50% of the mixture), and 0.5% to 6% polyvinyl alcohol fiber such as Vinal 105 manufactured by Kuraray. The chemically modified high alpha pulp is used to provide bulk and debonding. The softwood pulp or the mixture of softwood pulp and hardwood pulp provides bonding strength. The polyvinyl alcohol fiber is thermally activated and migrates to the surface of the tactile sheet during the drying. At the surface the polyvinyl alcohol fiber provides surface integrity and finish so that loose fibers at the surface are minimized, and thereby lateral wicking of the writing fluid is minimized.

The tactile sheet is formed from the highly dilute furnish in a conventional manner on the inclined wire paper making machine to a basis weight of from 75 to 200 gsm depending on the intended use of the final tactile imaging paper. The preferred basis weight for the tactile sheet of the present invention is 125 gsm. After the tactile sheet has been formed, it is then dried on conventional drying cans. During the wet forming process, the tactile sheet is not subjected to any wet pressing. As a result, the dry tactile sheet has an initial density of from 0.15 to 0.35 g/cc.

Once the tactile sheet has been dried, it is then dry calendered between a steel roll and a soft rubber roll at a loading pressure of 10 to 20 pounds per square inch (psi). The calendering increases the density of the tactile sheet to a range of from about 0.3 to 0.9 g/cc. The preferred density is 0.6 g/cc. Moreover, the tactile sheet has a porosity of greater than 1,000 cm/min.

The tactile sheet and the backing sheet are laminated together using a 0.5 mil sheet of high density polyethylene to produce the improved tactile imaging paper of the present invention. Particularly the tactile imaging paper made in accordance with the present invention exhibits a tactile rise of 6.0 mils on average and 4.5 mils minimum.

In order to illustrate the present invention Samples 1–6 of the tactile sheet were made. Samples 1–3 were made in accordance with the present invention, and Samples 4–6 were formed using wet pressing during the tactile sheet forming process. The samples all used the same furnish of 40% chemically modified high alpha pulp (Mersanier), 58% softwood pulp (Federal Albacel), and 2% polyvinyl alcohol fiber (Vinal 105). The target basis weight for the tactile sheet was 125 gsm, but the basis weight for the samples varied from 122.4 gsm to 131.6 gsm. Once the samples were made, they were tested for density, porosity, tear strength, and tactile rise. The results are reported in Table 1.

TABLE 1

WET PRESSED vs DRY CALENDERING:
DENSITY, STRENGTH, POROSITY AND RISE

| Samples | Method | Basis Weight (gsm) | Density (g/cc) | In-plane Tear Absolute (g-cm) | In-plane Tear Intrinsic (cc × $10^3$) | Porosity (cm/min.) | Tactile Rise (mil) |
|---|---|---|---|---|---|---|---|
| 1 | Dry Calendered | 123.9 | 0.33 | 250.8 | 2.0237 | 4683 | 4.5 |
| 2 | Dry Calendered | 122.6 | 0.43 | 253.0 | 2.0647 | 3026 | 5.8 |
| 3 | Dry Calendered | 123.8 | 0.72 | 203.0 | 1.6580 | 627 | 4.5 |
| 4 | Wet Pressed | 122.4 | 0.32 | 368.8 | 3.0136 | 2960 | 2.1 |
| 5 | Wet Pressed | 129.1 | 0.44 | 392.7 | 3.0398 | 2042 | 4.1 |
| 6 | Wet Pressed | 131.6 | 0.71 | 355.5 | 2.7011 | 491 | 3.1 |

The basis weight of the samples was determined in accordance with Federal Test Method 191A, Method 5040. The density of the samples was determined in accordance with ASTM Test Method D202-Method A. The in-plane tear strength of the samples was determined using the In-Plane Tear Tester—Model 66-1, manufactured by Thwing Albert Instrument. The porosity of the samples is expressed as CORESTA permeability which is the superficial velocity, in centimeters per minute, of air flowing through a porous paper at a pressure differential of 1 centibar. The tactile rise was measured by first laminating the tactile sheet to a backing sheet using 0.5 mil high density polyethylene as an adhesive. The resulting tactile imaging paper was then written on using a felt tipped pen with the writing fluid described in the Traylor et al reference. Particularly the writing fluid was of the following composition: 20% sucrose; 4–5% acid dye; 0.1% preservative (a liquid phenol); and 0.1% surface wetting agent. The sheet was allowed to air dry, and the height of the tactile rise was then measured.

FIGS. 1 and 2 show the relationships between the measured parameters and the tactile rise. Particularly, tactile rise is plotted as a function of sample density in both FIGS. 1 and 2 (curve 1 for the inventive dry calendered Samples 1–3 and curve 2 for the wet pressed Samples 4–6). In FIG. 1 the porosity for the inventive dry calendered Samples 1–3 (curve 3) and for the wet pressed Samples 4–6 (curve 4) is plotted as a function of density to show the relationship of porosity to rise. In FIG. 2 the in-plane tear strength for the dry calendered Samples 1–3 (curve 5) and for the wet pressed Samples 4–6 (curve 6) is plotted as a function of density to show the relationship of in-plane tear strength to rise.

The plots shown in FIGS. 1 and 2 help identify the target values for density, porosity, and in-plane tear strength for which optimum tactile rise is achieved. Moreover, the plots for the wet pressed samples show the importance of maintaining a debonded sheet during the manufacturing process to assure improved tactile rise.

We claim:

1. A method for forming a tactile sheet for tactile imaging paper comprising the steps of:
   a. preparing a furnish comprising by weight from 30% to 60% chemically modified high alpha pulp, 35% to 70% of a mixture of softwood pulp and hardwood pulp with the hardwood pulp comprising up to 50% of the mixture, and 0.5% to 6% polyvinyl alcohol fiber;
   b. forming the tactile sheet without densification while the tactile sheet is wet;
   c. drying the tactile sheet; and
   d. densifying the tactile sheet.

2. A method for forming a tactile sheet for tactile imaging paper comprising the steps of:
   a. preparing a furnish comprising by weight from 30% to 60% chemically modified high alpha pulp, 35% to 70% softwood pulp, and 0.5% to 6% polyvinyl alcohol fiber;
   b. forming the tactile sheet without densification while the tactile sheet is wet;
   c. drying the tactile sheet; and
   d. densifying the tactile sheet.

3. The method of claim 1 or 2, wherein densifying the tactile sheet is accomplished by dry calendering the tactile sheet to a density of from 0.3 to 0.9 g/cc.

4. The method of claim 3, wherein the tactile sheet has a porosity of greater than 1,000 cm/min.

5. The method of claim 3, wherein the tactile sheet has a basis weight of from 75 to 200 gsm.

6. The method of claim 1 or 2, wherein the method comprises the additional step of laminating the tactile sheet to a fluid impervious backing sheet.

7. The method of claim 6, wherein the backing sheet is a cellulosic sheet bonded to the tactile sheet with a liquid impervious film layer.

8. A tactile imaging paper comprising:
   a. a backing sheet laminated to,
   b. a tactile sheet;
      i. comprising by weight from 30% to 60% chemically modified high alpha pulp, 35% to 70% of a mixture of softwood pulp and hardwood pulp with the hardwood pulp comprising up to 50% of the mixture, and 0.5% to 6% polyvinyl alcohol fiber;
      ii. having a density of from 0.3 to 0.9 g/cc; and
      iii. having a porosity greater than 1,000 cm/min.

9. A tactile imaging paper comprising:
   a. a backing sheet laminated to,
   b. a tactile sheet;
      i. comprising by weight from 30% to 60% chemically modified high alpha pulp, 35% to 70% softwood pulp and 0.5% to 6% polyvinyl alcohol fiber;
      ii. having a density of from 0.3 to 0.9 g/cc; and
      iii. having a porosity greater than 1,000 cm/min.

10. The tactile imaging paper of claim 8 or 9, wherein the tactile sheet has a basis weight of from 75 to 200 gsm.

11. The tactile imaging paper of claim 8 or 9, wherein the backing sheet is fluid impervious.

12. The backing sheet of claim 11, wherein the backing sheet is a cellulosic sheet bonded to the tactile sheet with a liquid impervious film layer.

13. A tactile sheet for a tactile imaging paper;
   a. comprising by weight from 30% to 60% chemically modified high alpha pulp, 35% to 70% softwood pulp, and 0.5% to 6% polyvinyl alcohol fiber;
   b. having a density of from 0.3 to 0.9 g/cc; and
   c. having a porosity greater than 1,000 cm/min.

14. A tactile sheet for a tactile imaging paper:
   a. comprising by weight from 30% to 60% chemically modified high alpha pulp, 35% to 70% of a mixture of softwood pulp and hardwood pulp with the hardwood pulp comprising up to 50% of the mixture, and 0.5% to 6% polyvinyl alcohol fiber;
   b. having a density of from 0.3 to 0.9 g/cc; and
   c. having a porosity greater than 1,000 cm/min.

15. The tactile imaging paper of claim 14 or 13, wherein the tactile sheet has a basis weight of from 75 to 200 gsm.

* * * * *